United States Patent [19]
Yokota

[11] Patent Number: 5,957,428
[45] Date of Patent: Sep. 28, 1999

[54] COMPOSITE-ACTION BUTTERFLY VALVE

[75] Inventor: Hiroshi Yokota, 11-11-302, Midori 1-Chome, Minami-Ku, Hiroshima-Shi, Hiroshima-Ken, Japan

[73] Assignees: Kabushiki Kaisha Yokota Seisakusho; Hiroshi Yokota, both of Hiroshima-ken, Japan

[21] Appl. No.: 09/068,143

[22] PCT Filed: Aug. 28, 1996

[86] PCT No.: PCT/JP96/02420

§ 371 Date: Aug. 12, 1998

§ 102(e) Date: Aug. 12, 1998

[87] PCT Pub. No.: WO97/18409

PCT Pub. Date: May 22, 1997

[30] Foreign Application Priority Data

Nov. 13, 1995 [JP] Japan ................................. 7-293935

[51] Int. Cl.$^6$ .............................................. F16K 1/22
[52] U.S. Cl. ..................................... 251/305; 251/304
[58] Field of Search ................................ 251/304, 305

[56] References Cited

U.S. PATENT DOCUMENTS

| | | | |
|---|---|---|---|
| 4,964,431 | 10/1990 | Ball et al. ........................... | 251/305 X |
| 5,195,719 | 3/1993 | Ball et al. ........................... | 251/305 X |
| 5,642,752 | 7/1997 | Yokota et al. ........................ | 137/413 |
| 5,713,556 | 2/1998 | Yokota ................................. | 251/249.5 |
| 5,735,308 | 4/1998 | Yokota et al. ........................ | 137/488 |
| 5,746,246 | 5/1998 | Yokota et al. ........................ | 137/514 |

FOREIGN PATENT DOCUMENTS

| | | |
|---|---|---|
| 10550 | 1/1981 | Japan . |
| 161265 | 10/1983 | Japan . |

*Primary Examiner*—John Fox
*Attorney, Agent, or Firm*—Ladas & Parry

[57] ABSTRACT

In the valve, a valve element (4) is supported on a valve element operating shaft (7) by a fixed-length support means (5) and a variable-length support means (6) connected to its back surface opposite the front surface facing a valve seat (3). The fixed-length support means (5) has an arm (5a) of a fixed length pivotally connected to the valve element (4) and mounted for turning on the valve element operating shaft (7), and the variable-length support means (6) of a variable length comprises an elastic member (6a) acting to reduce the distance between the opposite ends of the variable-length support means (6), a transmission mechanism for converting the torque of the valve element operating shaft (7) into a force to increase the distance between the opposite ends of the variable-length support means (6), and a stopper (6f) for limiting the range of variation of the distance between the opposite ends of the variable-length support means (6). An external torque is applied to the valve element operating shaft (7) to operate the valve element (4).

3 Claims, 4 Drawing Sheets

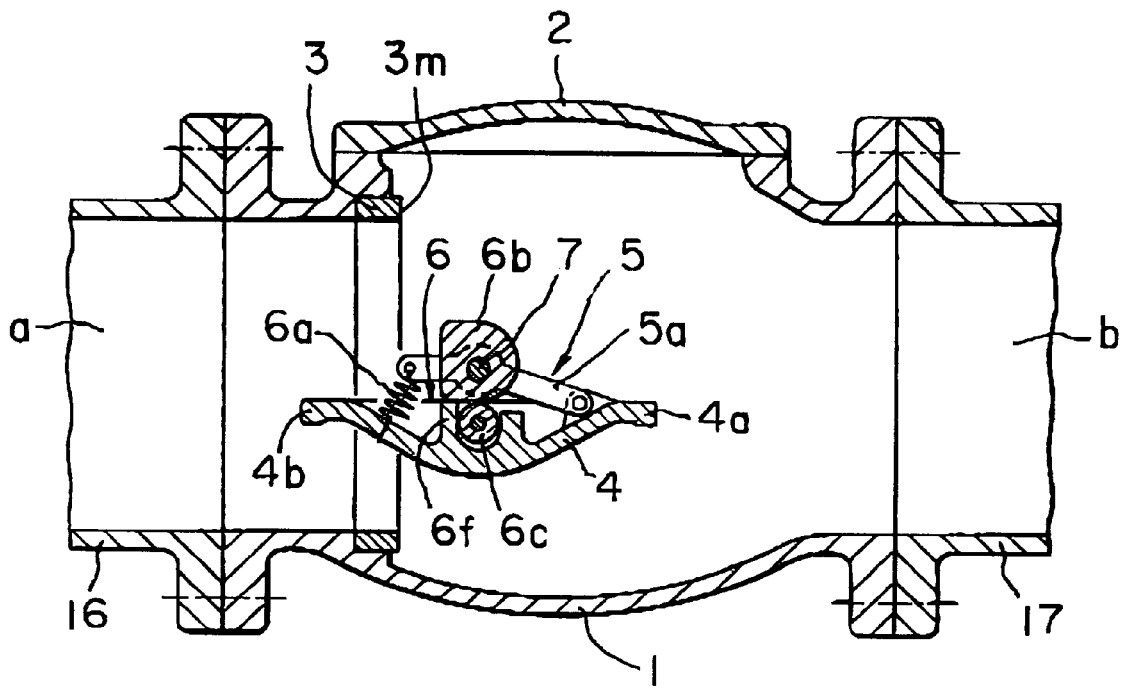
F I G. 1
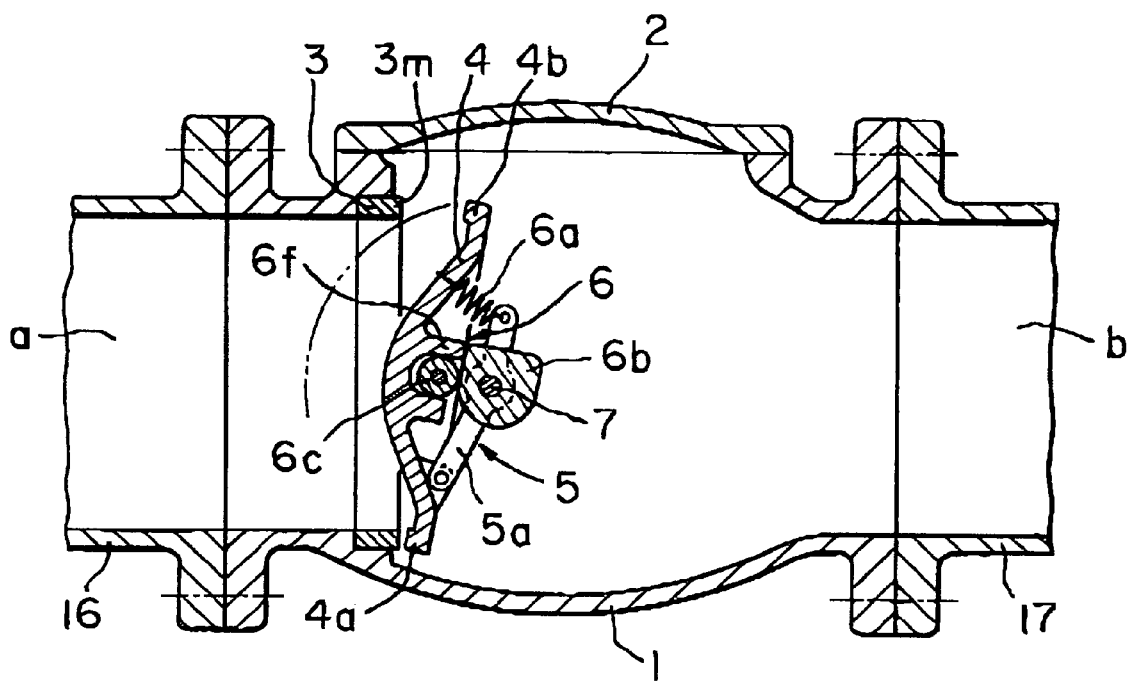
F I G. 2

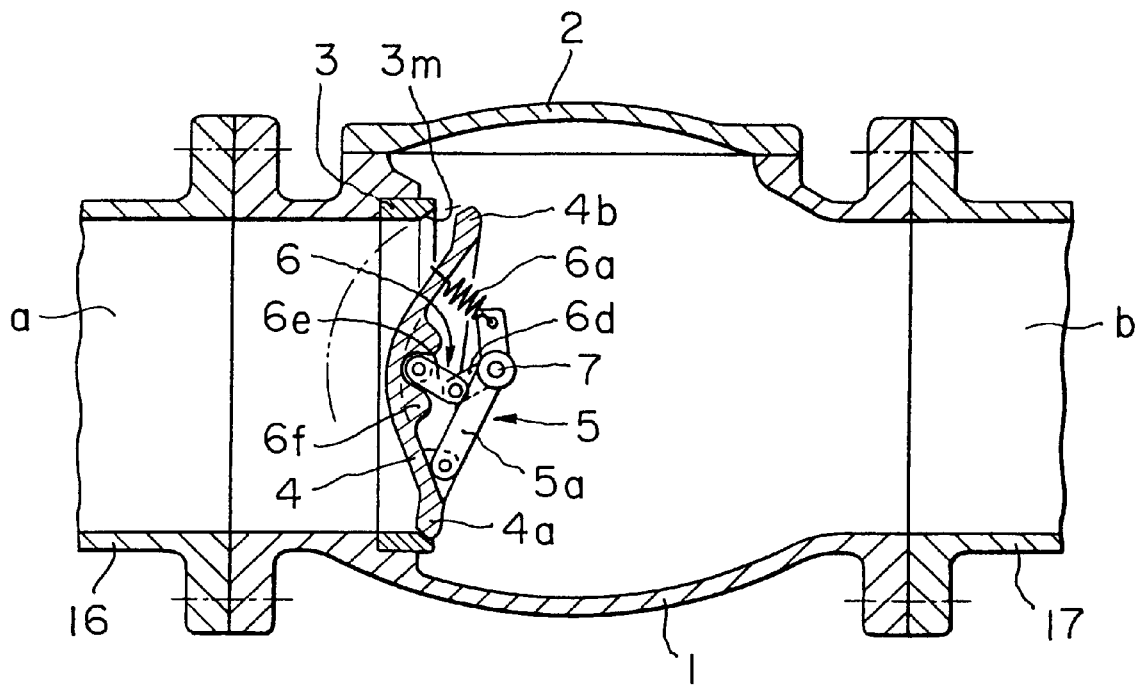
F I G. 5
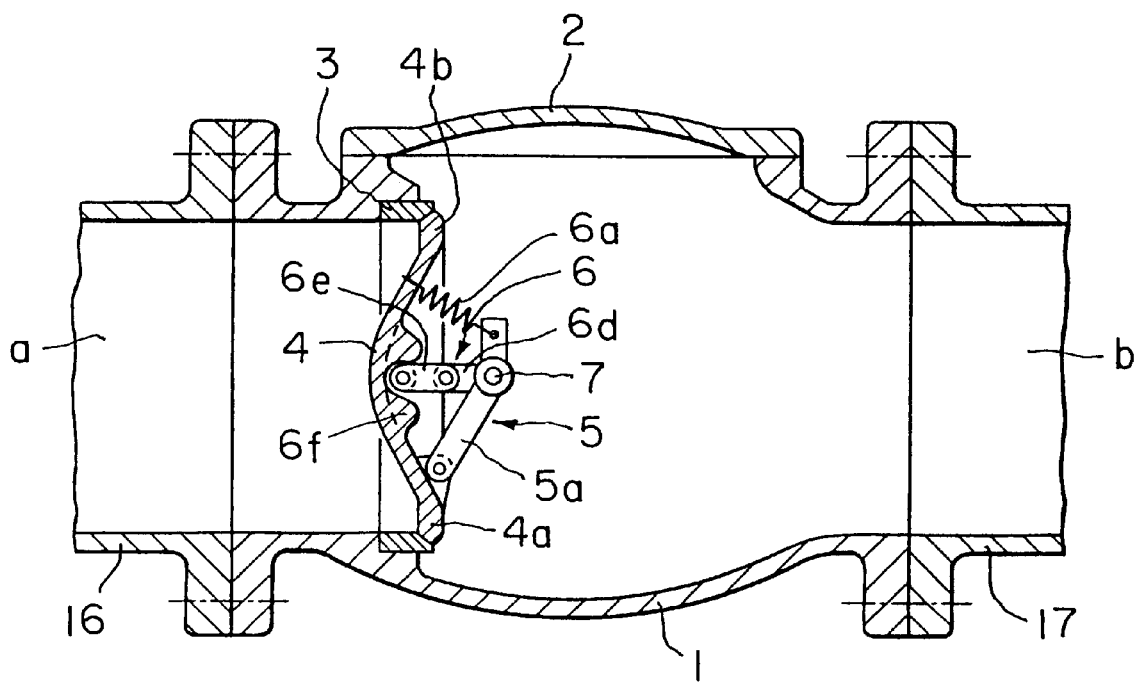
F I G. 6

COMPOSITE-ACTION BUTTERFLY VALVE

TECHNICAL FIELD

The present invention relates to a valve to be installed in a fluid transport line to regulate and stop fluid flow by composite actions of a valve element relative to a valve seat. In the description, the term "fluid" is used as a general term for liquids and gases.

BACKGROUND ART

As is generally known, butterfly valves, gate valves, ball valves and globe valves have universally been used for regulating and stopping fluid flow.

In most prior art valves, a valve element fixed to a valve element operating shaft is opened and shut by operating a handle or the like. Such valves are economical in their own way as long as the valves are used under moderate service conditions. However, various technical problems arise in the prior art valves due to structural restrictions thereon when the valves are used under severe service conditions for handling high-temperature, high-pressure slurry, corrosive fluids or the like.

Examples of technical problems that may arise in prior art valves will be explained.

(A) As regards butterfly valves, head loss across a butterfly valve due to resistance exerted by the butterfly valve on fluid flow is low when the butterfly valve is in a fully open state. The structure of butterfly valves requires the valve element to sidle up to the valve seat to rest on the valve seat. (Such a mode of closing movement of the valve element will be referred to as "slide sidling mode" for the sake of convenience in the following description.) Movement of the valve element in the slide sidling mode entails the abrasion of sealing surfaces that deteriorates the sealing effect of the sealing surfaces. As is obvious from FIG. 8 showing a prior art butterfly valve, it is difficult to achieve uniform, close contact between the sealing surfaces even if the sealing surfaces are formed in spherical surfaces or an eccentric valve element operating shaft is employed. Furthermore, the valve element and the valve seat will be damaged if a foreign matter is stuck between the sealing surfaces when seating the valve element on the valve seat. Although various attempts, such as putting elastic members on the sealing surfaces, have been made to secure satisfactory sealing contact, those attempts are symptomatic means merely capable of supplementing imperfect sealing contact. Durability of elastic member formed of rubber is insufficient when used under severe service conditions, such as conditions requiring handling high-temperature, high-pressure slurry, corrosive fluids or the like. Elastic members of a metal must be formed in a very intricate construction to provide the elastic members with satisfactory elasticity. If a valve element operating shaft 7 is biased relative to the valve element 4 as shown in FIG. 8, torque necessary for operating the valve element 4 increases and, additional problems in strengthening the valve element operating shaft and increasing valve element driving force arise.

(B) As regards gate valves, the valve element slides substantially in parallel to the valve seat for opening and shutting. Therefore, gate valves exert high resistance on fluid flow, cause rapid abrasion, and need elastic members to be put on the sealing surfaces to secure satisfactory sealing contact, which entails problems similar to those entailed by the butterfly valves.

(C) As regards ball valves, head loss across a ball valve due to resistance exerted on fluid flow is low when the ball valve is in a fully open state. However, the mating surfaces of the valve element and the valve seat must be finished in precision spherical surfaces, elastic members need to be put on the sealing surfaces to secure satisfactory sealing contact, which entails problems similar to those entailed by butterfly valves.

(D) Globe valves are less subject to problems in material and machining than butterfly valves, gate valves and ball valves, and are capable of securing satisfactory sealing contact. However, head loss across globe valves due to resistance exerted on fluid flow is large when the globe valves are in a fully open state.

The problems explained in (A) to (D) by way of example are more serious in large valves and in valves to be used in high-pressure fluid transport lines. Accordingly, it has been believed that it is difficult, from the viewpoint of structure, to achieve the reduction of head loss when the valve is fully open, the reduction of valve element drive torque, the avoidance of abrasion of sealing surfaces due to the sliding movement of the valve element in being seated on the valve seat and the uniform, close contact between the sealing surfaces simultaneously, and any effective techniques to achieve those requirements have not been developed.

Accordingly, it is an object of the present invention to provide a high-performance, economical valve having a simple, rational structure, capable of radically solving those technical problems which could not have been solved, of being easily designed and manufactured, of enabling the use of all kinds of materials including metals and ceramic materials and of enduring the harmful actions of high-temperature, high-pressure slurry and corrosive fluids, and not causing problems when formed in a large size.

DISCLOSURE OF THE INVENTION

With the foregoing object in view, in a composite-action butterfly valve according to the present invention to be disposed in a fluid transport line to regulate the flow of a fluid, a valve element 4 is supported on a valve element operating shaft 7 through two support means having different functions including a fixed-length support means 5 and a variable-length support means 6, which are connected to its back surface opposite the front surface facing a valve seat, the fixed-length support means 5 comprises an arm 5a of a fixed length pivotally connected to the valve element 4 and mounted for turning on the valve element operating shaft 7, and the variable-length support means 6 of a variable length comprises an elastic member 6a acting to reduce the distance between the opposite ends of the variable-length support means 6, a transmission mechanism for converting the torque on the valve element operating shaft 7 into an operating force to increase the distance between the opposite ends of the variable-length support means 6, and a stopper 6f for limiting the range of variation of the distance between the opposite ends of the variable-length support means 6.

An external torque is applied to the valve element operating shaft 7 to operate the valve element 4.

The transmission mechanism may be a cam mechanism comprising a plate cam 6b fixedly mounted on the valve element operating shaft 7, and a cam follower 6c mounted on the valve element 4 so as to be in contact with the plate cam 6b.

The transmission mechanism may be a two-link linkage formed by pivotally joining links 6d and 6e, and having one end fixed to the valve element operating shaft 7 and the other end connected to the valve element 4.

When the valve is in a fully open state, the valve element 4 is attracted to the valve element operating shaft 7 by the resilience of the elastic member 6a and is kept so as to extend along streamlines in a fluid passage so that head loss due to resistance exerted by the valve element 4 on the flowing fluid is small.

When the valve element operating shaft 7 is turned to close the valve, the valve element 4 approaches the valve seat 3, turning together with the valve element operating shaft 7, an end part of the valve element 4 near the pivot for the arm 5a comes first into contact with the valve seat 3, then the valve element 4 is pushed toward the valve seat 3 by the action of the transmission mechanism and, finally, the valve element 4 is seated on the valve seat 3 with the entire sealing surface thereof in close contact with the sealing surface of the valve seat 3. In the final stage of the valve closing operation for seating the valve element 4 on the valve seat 3, the valve element is moved substantially perpendicularly to the sealing surface of the valve seat 3 and, therefore, the detrimental effect of the movement of the valve element 4 in the slide sidling mode can be obviated and the sealing surface of the valve element 4 can be brought into firm, uniform, close contact with the sealing surface of the valve seat 3.

BRIEF DESCRIPTION OF THE DRAWINGS

FIG. 1 is a longitudinal sectional view of a composite-action butterfly valve in a first embodiment according to the present invention in a nearly fully open state;

FIG. 2 is a longitudinal sectional view of the composite-action butterfly valve of FIG. 1 in a state immediately before a fully closed state;

FIG. 5 is a longitudinal sectional view of the composite-action butterfly valve of FIG. 4 in a state immediately before a fully closed state;

FIG. 6 is a longitudinal sectional view of the composite-action butterfly valve of FIG. 4 in a fully closed state;

BEST MODE FOR CARRYING OUT THE INVENTION

Preferred embodiments of the present invention will be described hereinafter with reference to the accompanying drawings.

Figure 3:
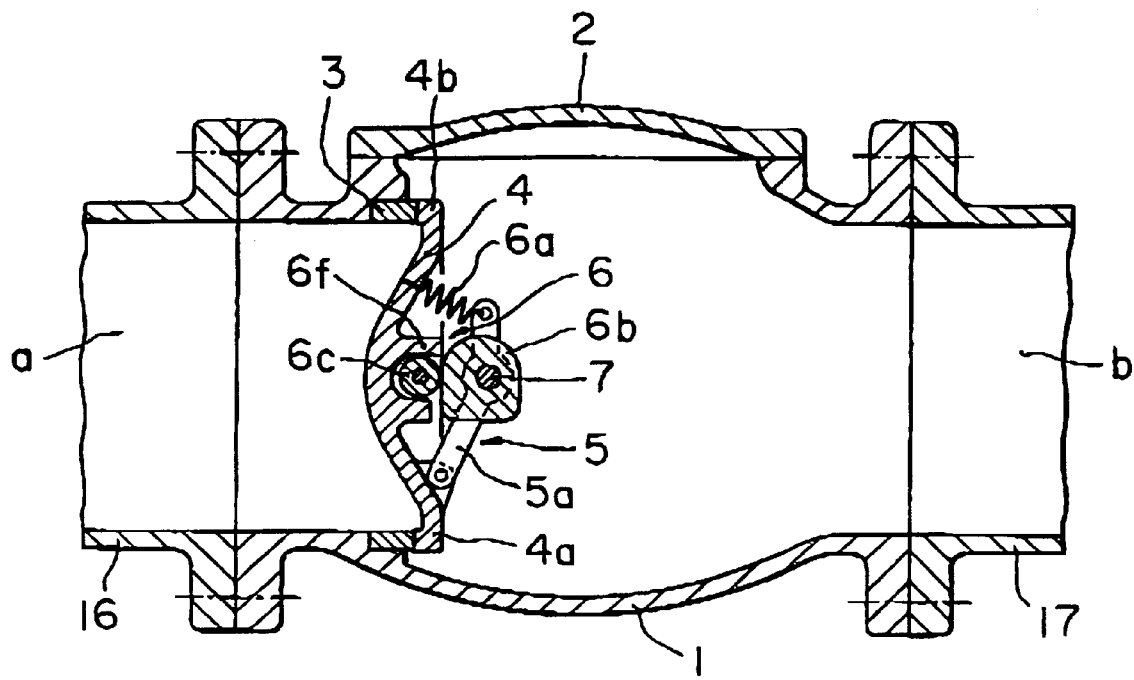
FIG. 3 is a longitudinal sectional view of the composite-action butterfly valve of FIG. 1 in a fully closed state.

Referring to FIGS. 1 to 3 showing a composite-action butterfly valve in a first embodiment according to the present invention, a valve casing 1 of the composite-action butterfly valve is disposed between pipes 16 and 17 of a fluid transport system, a valve cap 2 is attached to the valve casing 1, and a valve seat 3 is fitted in an opening of the valve casing 1. The composite-action butterfly valve forms a flow passage between an inlet flow passage a and an outlet flow passage b. A valve element 4 is supported on a valve element operating shaft 7 by a fixed-length support means 5 of a fixed length and a variable-length support means 6 of a variable length attached to the back surface of the valve element, opposite the front surface thereof facing the valve seat 3. The fixed-length support means 5 has an arm 5a of a fixed length pivotally connected to the valve element 4 and mounted for turning on the valve element operating shaft 7. The variable-length support means 6 comprises an elastic member 6a acting to reduce the distance between the opposite ends of the variable-length support means 6, a transmission mechanism for converting the torque of the valve element operating shaft 7 into a force to increase the distance between the opposite ends of the variable-length support means 6, and a stopper 6f for limiting the range of variation of the distance between the opposite ends of the variable-length support means 6. Although the variable-length support means 6 is located near the central part of the valve element 4 in the figures to facilitate understanding, the variable-length support means 6 may be located at a position other than the position near the central part of the valve element 4. The valve element operating shaft 7 is supported on the valve casing 1. A torque is applied to the valve element operating shaft 7 by means of a handle or an electric motor or the like to open and close the composite-action butterfly valve.

The transmission mechanism comprises a plate cam 6b fixedly mounted on the valve element operating shaft 7, and a cam follower 6c mounted on the valve element 4 so as to be in contact with the plate cam 6b.

The operation of the composite-action butterfly valve in the first embodiment will be described with reference to FIGS. 1 to 3. When the composite-action butterfly valve is in a fully open state as shown in FIG. 1, the valve element 4 is kept so as to extend along streamlines in the fluid passage so that head loss due to resistance exerted by the valve element 4 on the flowing fluid is small. In the fully open state, the fluid exerts pressure substantially evenly to regions of the surface of the valve element 4 on the opposite sides of the center of the valve element 4 and hence only a small moment of force about the valve element operating shaft 7 acts on the valve element 4. The resilience of the elastic member 6a acting to reduce the distance between the opposite ends of the variable-length support means 6 holds the plate cam 6b in contact with the stopper 6f, so that the valve element 4 is attracted to the valve element operating shaft 7 so as to be turned together with the valve element operating shaft 7.

When a torque is applied to the valve element operating shaft 7 by operating a handle or by a driving device, such as an electric motor, to turn the valve element operating shaft 7 clockwise, as viewed in FIG. 1, to close the composite-action butterfly valve, the valve element 4 turns together with the valve element operating shaft 7 and approaches the valve seat 3. Then, a contact surface of an end part 4a of the valve element 4 near the pivot for the arm 5a comes first into contact with a sealing surface 3m of the valve seat 3 as shown in FIG. 2. As the torque is applied continuously to the valve element operating shaft 7, the plate cam 6b is separated from the stopper 6f. The torque applied to the valve element operating shaft 7 operates a cam mechanism to push the valve element 4 toward the valve seat 3 by a multiplied force of the cam mechanism against the pressure of the fluid flowing through the flow passage and against the resilience of the elastic member 6a and, finally, the opposite end part 4b of the valve element is seated on the valve seat 3 with the entire sealing surface thereof in close contact with the sealing surface of the valve seat 3 as shown in FIG. 3.

In the final stage of the valve closing operation for seating the valve element 4 on the valve seat 3, the valve element 4 is moved directly onto the sealing surface 3m of the valve seat 3, that is, onto the pressing surface against which the valve element 4 is pressed when the valve is closed, the valve element 4 is moved substantially perpendicularly to the sealing surface of the valve seat 3 and, therefore, the detrimental effect of the movement of the valve element 4 in the slide sidling mode can be obviated. The moderately loose connection of the fixed-length support means 5 to the valve element 4 and the valve element operating shaft 7 is effective in seating the valve element 4 on the valve seat 3 with the corresponding sealing surfaces in firm, uniform, close contact with each other.

The foregoing series of operations is reversed when opening the composite-action butterfly valve.

Thus the foregoing technical problems which could not have been solved can be economically and radically solved. It will be understood from an observation of a transient process from the state shown in FIG. 2 to the state shown in FIG. 3 that the composite-action butterfly valve has an additional advantage that fine flow regulation is possible in a state where the flow rate of the fluid is very low.

The shape of the plate cam 6b may be selectively determined according to the purpose of the composite-action butterfly valve. The relation between the angular position of the valve element operating shaft 7 and the opening of the composite-action butterfly valve can be properly determined by properly designing the shape of the plate cam 6b. Although the cam follower 6c of the composite-action butterfly valve shown in FIGS. 1 to 3 is a roller capable of reducing resistance against the turning of the cam plate 6b, the cam follower 6c may be a member in sliding contact with the plate cam 6b. A groove cam provided with a cam groove may be employed instead of the plate cam 6b, and the cam follower 6c may move in the cam groove for the further effective suppression of the vibration of the valve element caused by turbulent flows or the unsymmetrical action of the pressure of the fluid on the valve element 4.

Figure 4:
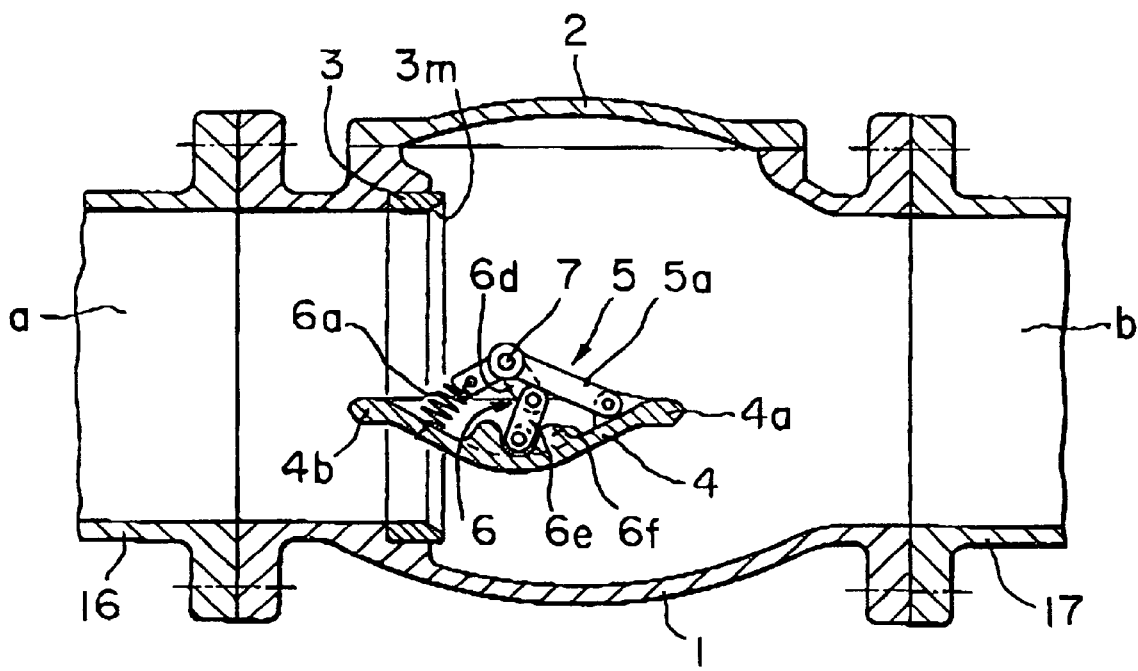
FIG. 4 is a longitudinal sectional view of a composite-action butterfly valve in a second embodiment according to the present invention in a nearly fully open state.

FIGS. 4 to 6 show a composite-action butterfly valve in a second embodiment according to the present invention employing a linkage as a transmission mechanism instead of the cam mechanism employed as a transmission mechanism in the first embodiment. The linkage is of a toggle joint type and includes two links 6d and 6e, and has one end fixed to a valve element operating shaft 7 and the other end connected to a valve element 4. The linkage, similarly to the cam mechanism, functions to convert torque into linear force with multiplication. The composite-action butterfly valve in the second embodiment is the same in other respects as the composite-action butterfly valve in the first embodiment and hence further description thereof will be omitted.

As is apparent from the foregoing description, the composite-action butterfly valve of the present invention exercises innovative operations and effects, is subject to various modifications in its construction without departing from the scope of the present invention and may incorporate prior art therein to meet practical requirements.

For example, the shape, the material and the position of the elastic member 6a, such as a spring, extended between the valve element 4 and the arm 5a so as to bias the valve element 4 continuously toward the arm 5a in the composite-action butterfly valves shown in FIGS. 1 to 6 may be selected from a large choice of shapes, materials and positions. Since the cam mechanism or the linkage exerts a high force against the resilience of the elastic member 6a, the elastic member 6a may be a very strong one. If it is desired to supplement the force of the elastic member 6a, the valve element operating shaft 7 may be positioned toward the end part 4a of the valve element 4 relative to the center of the valve element 4 to use the pressure of the flowing fluid for supplementing the force of the elastic member 6a.

It is desirable that the joint between the arm 5a and the valve element 4 lies near a straight line connecting a point on the end part 4a in contact with the valve seat 3, and the axis of the valve element operating shaft 7, to prevent the sliding movement of the end part 4a relative to the sealing surface 3m of the valve seat 3 during the closing movement of the valve element 4 after the end part 4a has come into contact with the valve seat 3.

It goes without saying that a member placed in the main flow passage of a valve, such as the valve element 4, is formed in a shape capable of reducing head loss attributable to the resistance of the member against the flowing fluid to the least possible extent. The components of the transmission mechanism, i.e., the cam mechanism or the linkage, may be disposed on a right side part and/or a left side part of the valve element 4 to form the transmission mechanism outside the main flow passage of the valve. The valve seat 3 and the valve element 4 of the composite-action butterfly valve may be provided with a known straightening grating or straightening projections to suppress turbulent flows or cavitation.

The sealing surface 3m of the valve seat 3 and the corresponding surface of the valve element 4 may be simple flat surfaces as shown in FIGS. 1 to 3, conical surfaces as shown in FIGS. 4 to 6, or curved surfaces. The shape of the section may be other than a circle, such as an appropriate circular or rectangular shape, to provide the composite-action butterfly valve with an appropriate flow control characteristic, i.e., the ratio: (Valve opening)/(flow rate).

The valve seat 3 and the valve element 4 may be made of metals and, if necessary, may be provided with an elastic sealing member, such as an O ring. Since the valve element 4 does not move in the slide sidling mode when being seated on the valve seat 3, the materials of the valve seat 3 and the valve element 4 can be selected from a large variety of materials including ceramic materials.

The arm 5a may be of a construction selected from among various conventional constructions. Although the arm 5a shown in FIGS. 1 to 6 has connecting pins having axes parallel to the axis of the valve element operating shaft 7, the arm 5a may be, for example, of a universal joint type (naturally, the range of motion of the valve element 4 should be limited) and the valve element 4 may be constructed so as to be movable in directions relative to the sealing surface 3m. In any case, the valve element 4 is held in a correct closing position, the valve element 4 can be seated on the valve seat 3 in uniform, close contact with the valve seat 3 and, if, by any chance, a foreign matter is stuck between the sealing surfaces when the valve element 4 is seated on the valve seat 3, the freedom of motion of the arm 5a protects the parts from being damaged.

The valve element operating shaft 7 may be an eccentric shaft whose rotary axis is deviated from its geometric center to control the valve element 4 for more delicate motions.

Figure 7:
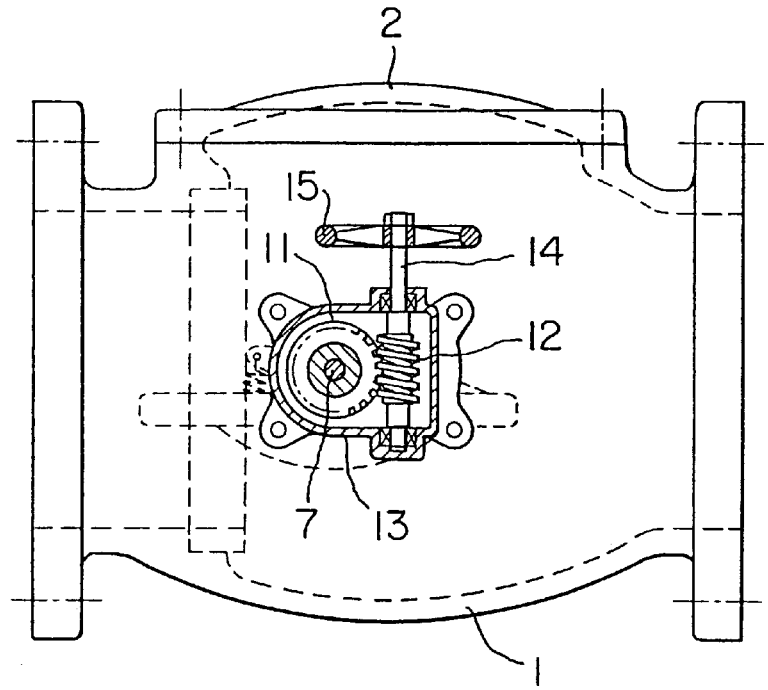
FIG. 7 is a partly sectional plan view of a valve element drive mechanism to be included in a composite-action butterfly valve according to the present invention.
Figure 8:
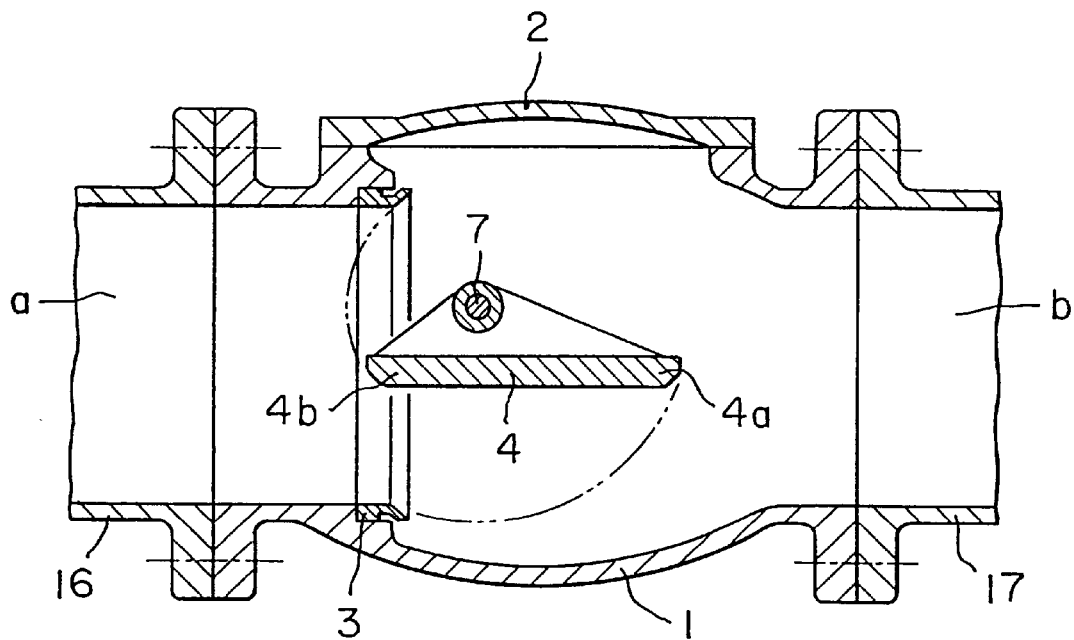
FIG. 8 is a longitudinal sectional view of a prior art butterfly valve.

Since the valve element 4 is operated through the transmission mechanism (the cam mechanism or the linkage), the valve element operating shaft 7 can be turned by a low torque, and flexible design meeting required conditions is possible. If the magnitude of the torque necessary to turn the valve element operating shaft 7 requires, a driving shaft 14 may be interlocked with the valve element operating shaft 7 by a irreversible reduction gear, such as a worm gearing comprising components 11, 12 and 13 as shown in FIG. 7.

Although only the torque applied to the valve element operating shaft 7 is used for all the operations for moving the valve element 4 from a fully open position toward the valve seat and seating the valve element 4 on the valve seat 3 in the foregoing embodiments, the transmission mechanism for pressing the valve element 4 against the valve seat 3 after the end part 4*a* has been brought into contact with the valve seat 3 may be driven by a power source other than that for applying the torque to the valve element operating shaft 7, or the transmission mechanism may be a hydraulic or pneumatic cylinder actuator.

The present invention is not limited in its practical application to the embodiments specifically described herein and various changes and variations are possible in the design thereof without departing from the scope of the present invention.

INDUSTRIAL APPLICABILITY

As is apparent from the foregoing description, the present invention employs a simple, clear structure based on a novel technical idea to solve the problems in the prior art valves drastically, and employs easy, economical, technical means to realize a novel composite-action butterfly valve provided with a valve element capable of reducing head loss due to resistance exerted by the valve element on fluid flow in a fully open state, of being moved by a low torque, and of being seated on a valve seat in uniform, close contact with the sealing surface of the valve seat without being moved in the slide sidling mode. The composite-action butterfly valve may entirely be made of metals, may be provided with components made of ceramic materials or other suitable materials. Therefore, economical materials for forming the components can easily be selected. The composite-action butterfly valve of the present invention can be installed at various parts in fluid transport facilities that operate under various service conditions for handling high-temperature, high-pressure slurry, corrosive fluids and the like, and require large valves. Thus the present invention exercises outstanding effects in designing, manufacturing, maintaining and controlling valves and has very prominent practical effects as compared with those of the prior art.

I claim:

1. A composite-action butterfly valve to be disposed in a fluid transport line to regulate a flow of a fluid, comprising a valve element to be moved relative to a valve seat to regulate the flow of a fluid through the fluid transport line;

wherein the valve element (4) is supported on a valve element operating shaft (7) through two support means having different functions including a fixed-length support means (5) and a variable-length support means (6), which are connected to a back surface of the valve element, opposite a front surface thereof facing a valve seat (3), the fixed-length support means (5) comprises an arm (5*a*) of a fixed length pivotally connected to the valve element (4) and mounted for turning on the valve element operating shaft (7), and the variable-length support means (6) of a variable length comprises an elastic member (6*a*) acting to reduce a distance between opposite ends of the variable-length support means (6), a transmission mechanism for converting a torque on the valve element operating shaft (7) into an operating force to increase the distance between the opposite ends of the variable-length support means (6), and a stopper (6*f*) for limiting a range of variation of the distance between the opposite ends of the variable-length support means (6);

an external torque being applied to the valve element operating shaft (7) to operate the valve element (4).

2. The composite-action butterfly valve according to claim 1, wherein the transmission mechanism is a cam mechanism comprising a plate cam (6*b*) fixedly mounted on the valve element operating shaft (7), and a cam follower (6*c*) mounted on the valve element (4) so as to be in contact with the plate cam (6*b*).

3. The composite-action butterfly valve according to claim 1, wherein the transmission mechanism is a two-link linkage formed by pivotally joining links (6*d*, 6*e*), and having one end fixed to the valve element operating shaft (7) and the other end connected to the valve element (4).

* * * * *